United States Patent
Jiang et al.

(10) Patent No.: US 11,199,106 B1
(45) Date of Patent: Dec. 14, 2021

(54) BLADE CONTAINMENT DEVICE

(71) Applicant: Hamilton Sundstrand Corporation, Charlotte, NC (US)

(72) Inventors: Yiwei Jiang, Rockford, IL (US); Michael D. Schelonka, Elgin, IL (US); Erik D. LeBeau, West Dundee, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/999,497

(22) Filed: Aug. 21, 2020

(51) Int. Cl.
*F01D 21/04* (2006.01)
*F02C 7/055* (2006.01)
*F01D 11/12* (2006.01)
*F01D 11/08* (2006.01)

(52) U.S. Cl.
CPC ............ *F01D 21/045* (2013.01); *F01D 11/08* (2013.01); *F01D 11/122* (2013.01); *F02C 7/055* (2013.01); *F05D 2220/323* (2013.01); *F05D 2240/14* (2013.01); *F05D 2260/607* (2013.01)

(58) Field of Classification Search
CPC ........ F01D 21/045; F01D 11/08; F01D 11/12; F01D 11/122; F05D 2240/14; F05D 2260/607; F02C 7/052; F02C 7/055
USPC ...................... 415/9, 173.1, 173.4
See application file for complete search history.

(56) References Cited

U.S. PATENT DOCUMENTS

| | | | |
|---|---|---|---|
| 3,652,176 A | 3/1972 | Walsh | |
| 4,639,188 A | 1/1987 | Swadley | |
| 5,462,403 A * | 10/1995 | Pannone | F01D 9/042 415/173.1 |
| 6,224,321 B1 | 5/2001 | Ebden et al. | |
| 6,499,940 B2 * | 12/2002 | Adams | F01D 11/08 415/121.2 |
| 6,829,883 B2 | 12/2004 | Sathianathan et al. | |
| 2007/0253804 A1 * | 11/2007 | Heyerman | F01D 9/045 415/9 |
| 2015/0218961 A1 | 8/2015 | Evans et al. | |
| 2018/0080339 A1 | 3/2018 | Kray et al. | |
| 2020/0277873 A1 * | 9/2020 | Brunet | F01D 11/122 |

FOREIGN PATENT DOCUMENTS

| | | |
|---|---|---|
| EP | 2620652 A1 | 7/2013 |
| EP | 3246532 A1 | 11/2017 |
| EP | 3640438 A1 | 4/2020 |

OTHER PUBLICATIONS

Keith Button, "Containing a Blade-out," Dated Jul./Aug. 2018, Website retrieved from: https://aerospaceamerica.aiaa.org/departments/containing-a-blade-out/ on Aug. 20, 2020, pp. 8.

* cited by examiner

*Primary Examiner* — Christopher Verdier
(74) *Attorney, Agent, or Firm* — Kinney & Lange, P.A.

(57) ABSTRACT

A shroud having an annular member extending along an axis from a first end to a second end. The annular member has an inside surface radially inward from an outside surface that diverges from the first end towards the second end relative to the axis. The shroud further includes a flange that extends radially outward from the outside surface and a recess, each located at the second end. The recess extends radially outward from the inside surface and circumferentially about the axis. An axial extent of the recess at least partially coincides with an axial extent of the flange.

20 Claims, 5 Drawing Sheets

BLADE CONTAINMENT DEVICE

STATEMENT OF GOVERNMENT INTEREST

This invention was made with government support under W58RGZ16C0047 and W58RGZ19C0003 awarded by the United States Army. The government has certain rights in the invention.

BACKGROUND

The present disclosure relates to containing rotational components of a turbomachine, and more specifically, containing impeller components, or fragments of components, released from an impeller assembly following structural failure.

To improve safe operation of turbomachinery in the event of an impeller failure, containment of impeller components, component fragments, or other high-speed rotational components within the impeller enclosure is necessary. For example, an enclosure surrounding fan blades of an aircraft engine are designed to absorb the impact of a fan blade released from the fan rotor. However, in other applications, the enclosure may have divergent walls rather than cylindrical walls typical of some fan enclosures. Additionally, the space provided for the impeller enclosure may be insufficient to incorporate the requisite energy-absorbing containment elements. In these instances, a detached impeller blade or other impeller fragment may contact the divergent enclosure walls and, thereafter, escape the enclosure.

One such space-constrained impeller enclosure surrounds a scavenge blower of an inlet particle separator system. Positioned near the exhaust of the scavenged air stream, the scavenge blower facilitates discharging sand, dust, and other small debris contained within an air stream diverted from an aircraft engine inlet. Erosion protection for the enclosure is provided by a metal shroud radially outward from the scavenge blower, which may include divergent walls surrounding the impeller. Due to the high rotating speed of the scavenge impeller during operation, containment of impeller blades or other impeller fragments is necessary to prevent damage to the engine or any other surrounding areas. However, because scavenge blowers are conventionally smaller than the engines they protect and may have strict weight and space constraints, typical blade-containment designs, such as those used for fan blade enclosures, are not ideal or practical. Accordingly, new containment elements and methods of containment are necessary for scavenge blower enclosures and other enclosures sharing like limitations.

SUMMARY

A shroud in accordance with one embodiment of the present invention includes an annular member extending along an axis from a first end to a second end and a flange extending radially outward at the second end. An inside surface of the annular member diverges from the first end towards the second end relative to the axis. At the second end of the shroud, a recess extends radially outward from the inside surface and circumferentially about the axis such that an axial extent of the recess at least partially coincides with an axial extent of the flange.

In another embodiment, the shroud is radially inward from an inlet housing and radially outward from an impeller to form a gap between the inside surface of the shroud and the tips of the impeller blades. The shroud recess has a position between trailing edges of the blades and the second end of the shroud.

DETAILED DESCRIPTION

As described herein, an impeller shroud with a divergent inner surface includes a recess devised to redirect a released impeller blade or other impeller fragment away from the impeller enclosure. The recess extends from the shroud inner surface and includes an axial extent that at least partially coincides with an axial extent of a flange located at a radially outermost end of the shroud. In the installed position, the flanged end supports the shroud while locating the shroud radially outward from tips of impeller blades to define a gap therebetween. Additionally, as installed, the recess is axially between trailing edges of the impeller blades and the flanged end of the shroud.

Benefits of the present invention include solving the problems described above, such as containing an impeller blade, or other impeller fragment, following structural failure while respecting strict weight and space constraints. Following a structural failure of the impeller, a blade, or other fragment of the impeller, moves radially outwards to contact the shroud. Thereafter, the impeller fragment slides along the inside surface of the shroud to contact the recess of the shroud, transferring some kinetic energy from the impeller fragment to the enclosure and redirecting the fragment's trajectory away from the stationary enclosure. This reduces the energy of the fragment impact on the shroud and stationary enclosure, containing the impeller fragment within the enclosure while preventing any portion of the enclosure from separating. Other benefits of the present invention include, at least, reduced weight, reduced space, ease of manufacturability, and low cost.

While the present invention may be shown in a limited number of figures and described in a limited number of embodiments, such as an inlet particle separator in the context of a scavenge blower assembly for an aircraft engine particle separator system, the present invention is not limited to the figures and embodiments disclosed and may be used in any shroud and enclosure design in which the materials are insufficient to contain an impeller blade or impeller fragment following structural failure of the impeller.

Figure 1:
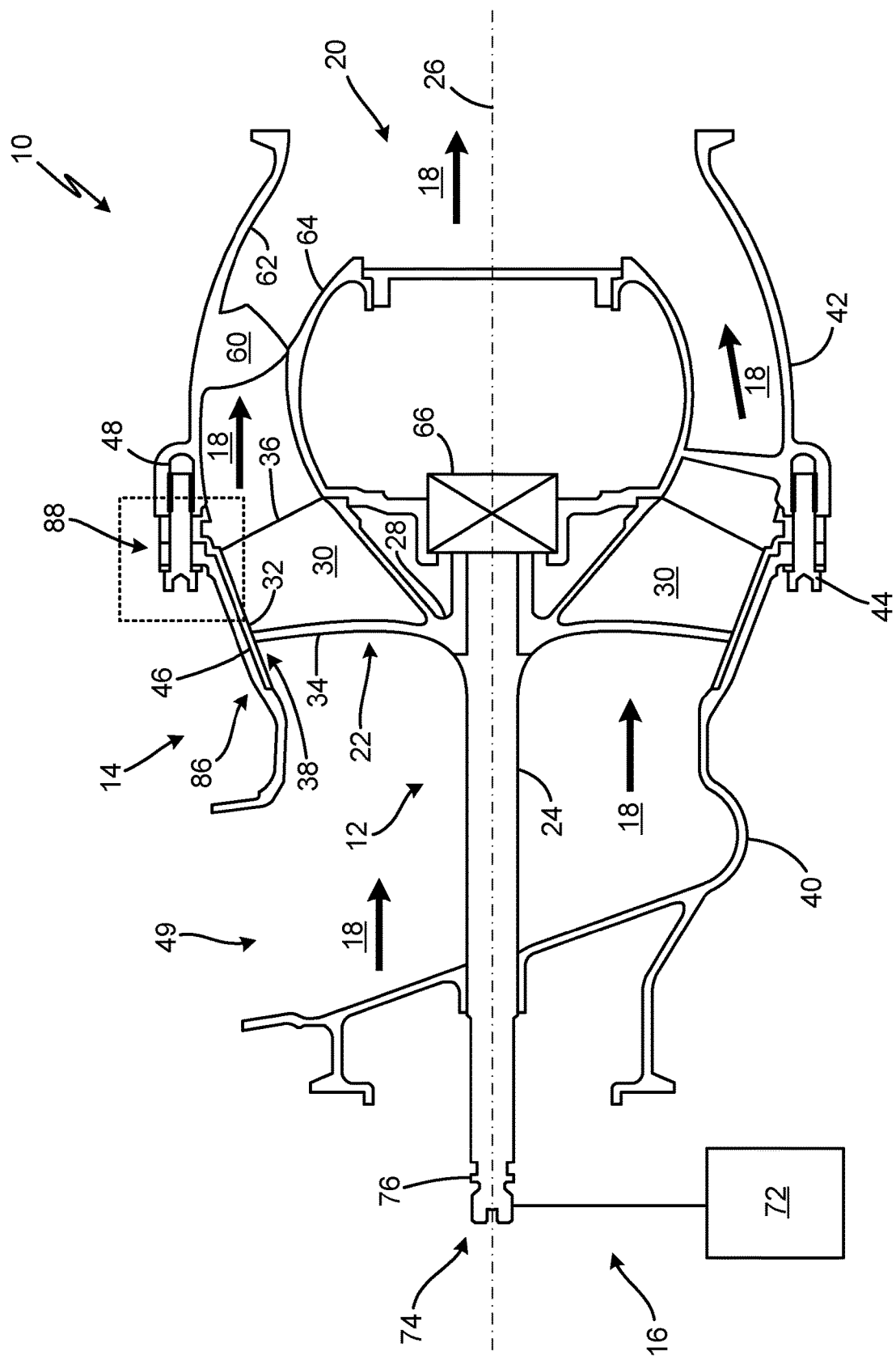
FIG. 1 is a cross-sectional view of an inlet particle separator blower taken through the rotational axis of the impeller.

FIG. 1 is a cross-sectional view of scavenge blower assembly 10 of an aircraft engine particle separator system. Scavenge blower assembly 10 includes rotor assembly 12 housed within stationary enclosure 14. Rotor assembly 12 is driven and supported by drive support system 16. Stationary enclosure 14 supports at least some of drive support system 16 and defines flow path 18 adapted to direct an air stream, containing a mix of air and particles, towards exhaust 20 of scavenge blower assembly 10.

Rotor assembly 12 includes impeller 22 mounted to shaft 24, which are rotatable about axis 26. Impeller 22 includes hub 28 and blades 30 which are circumferentially spaced about axis 26. Each of blades 30 is defined by one or more airfoil sections spaced along a radial direction relative to axis 26. Each airfoil section includes a convex suction-side curve, a concave pressure-side curve, and a linear chord line extending from leading edge 34 to trailing edge 36 that define suction-side and pressure-side surfaces of each blade 30. Blades 30 extend radially outwards relative to axis 26 from hub 28 to respective blade tips 32 and extend in a chordwise direction from leading edges 34 to respective trailing edges 36. Blade tips 32 diverge radially outward relative to axis 26 from leading edges 34 towards respective trailing edges 36. Tips 32 are shaped or positioned to create gap 38 between tips 32 and stationary enclosure 14.

Stationary enclosure 14 includes inlet housing 40, outlet housing 42, fasteners 44, and shroud 46. Shroud 46 is radially inward from inlet housing 40 and radially outward from tips 32 of impeller blades 30 and defines a radially outer boundary of flow path 18. Inlet housing 40, shroud 46, and outlet housing 42 are axially clamped together by circumferentially spaced fasteners 44, with shroud 46 disposed between flanges of inlet housing 40 and outlet housing 42. Fasteners 44 may include external threads that engage internal threads 48 of outlet housing 42 as shown, or may be any other known fastener attachment.

Inlet housing 40 defines opening 49 for flow path 18 so that air containing particles and debris can be diverted from an engine inlet to enter scavenge blower assembly 10, allowing the engine to be protected from harmful particles and debris. Shroud 46 provides erosion protection to the housing by surrounding blade tips 32 such that abrasive particles and debris do not erode housing material during rotation of impeller 22. Shroud 46 provides primary containment in the event of a blade 30 failure during operation. Outlet housing 42 includes stationary vanes 60. Stationary vanes 60 extend radially inward from radially-inward-facing inner-outlet-housing surface 62 to radially-outward-facing inner-outlet-housing surface 64, being radially distributed around axis 26 and at least partially incident to a radially extending plane normal to axis 26. Stationary vanes 60 help to direct air flow as desired for ideal blower 10 operation but may also prevent an impeller blade or other impeller fragment from escaping stationary enclosure 14.

The materials of impeller 22 and shroud 46 may be chosen to resist erosion from sand and other debris. In an exemplary embodiment shroud 46 and impeller 22 are steel, and inlet housing 40 and outlet housing 42 are aluminum.

Drive support system 16 includes bearing 66, and accessory gearbox 72. Bearing 66 is supported by outlet housing 42 and is axially aligned with axis 26. Exterior end 74 of shaft 24 is structurally supported by and driven by gearbox 72 such that in operation impeller 22 is driven to high speeds, generating air flow and large radial forces of blades 30 in motion. The rotation of impeller 22 continuously pulls air flow into inlet housing 40 and pushes air out of outlet housing 42 through flow path 18. Shaft 24 includes rotor interface 76 at exterior end 74. Rotor interface 76 may be a shaft spline, such as a parallel key spline, a hub with internal spline, or other rotor interface feature used to transfer torque from a gearbox to a shaft.

Shroud 46 can take a number of different forms. In the following description, four embodiments are described: a shroud of an assembly with a frustoconical recess (FIG. 2A), a shroud of an assembly with a frustoconical recess with a concave portion (FIG. 2B), a shroud of an assembly with a protrusion and a frustoconical recess with a concave portion (FIG. 2C), and a shroud of an assembly with a recess with a concave surface (FIG. 2D). Each of these figures includes shroud 46, impeller 22, inlet housing 40, outlet housing 42, and fasteners 44. Fasteners 44 include bolts 78 and washers 80 used in tandem and fastened through one or more of inlet housing 40, shroud 46, and outlet housing 42 to axially clamp the components together. Outlet housing 42 is coupled to inlet housing 40, wherein flange 82 of shroud 46 is axially disposed between inlet and outlet housing 42, thereby axially restraining shroud 46 with respect to inlet housing 40 and outlet housing 42.

In each embodiment shown, shroud 46 includes annular member 84 extending from first end 86 to second end 88 relative to axis 26, and inside surface 90 radially inward from outside surface 92. Inside surface 90 diverges from first end 86 towards second end 88 relative to axis 26. The shape of inside surface 90 may be a conical frustum. Shroud 46 further includes recess 94 and flange 82. Flange 82 is located at second end 88 and extends radially outward from outside surface 92. Recess 94 is located at second end 88 and extends radially outward from inside surface 90 and circumferentially about axis 26. An axial extent of recess 94 at least partially coincides with an axial extent of flange 82.

Recess 94 is located between trailing edge 36 of blade 30 and second end 88 of annular member 84. Recess 94 may trap and, alternatively and/or in combination, deflect blades and blade fragments in a blade-off event. Radial depth of recess 94 is defined as the perpendicular distance from inside surface 90 to radially outermost point of recess 94 respective to axis 26. Axial width of recess is measured incident or tangent to inside surface 90 of shroud 46, in a direction incident to a plane that is incident to axis 26. Varying radial depth and axial width of recess 94 varies the likelihood of the blade to be trapped and/or deflected in a blade-off event. Factors that may be used to determine radial depth and axial width of recess 94 include: likelihood to trap blade or blade fragment; likelihood to deflect blade or blade fragment; axial width of flange 82 measured parallel to axis 26; thickness of annular member 84 of shroud 46 measured between inside surface 90 and outside surface 92; smallest distance between surfaces of recess 94 and any point on any hole surface of shroud 46 that receives or engages fastener 44; and cross-sectional shape of blade tip 32 dissected by a plane radially extending from and normal to axis 26.

Furthermore, in each embodiment of FIGS. 2A-2D inlet housing 40 has first pilot surface 96 and outlet housing 42 has second pilot surface 98. Radially-outward-facing first annular surface 100 of shroud 46 opposes first pilot surface 96 of inlet housing 40. Radially-outward-facing second annular surface 102 of shroud 46 opposes second pilot surface 98 of outlet housing 42. Flange 82 is disposed between first annular surface 100 and second annular surface 102 of shroud 46.

A summation of axial width of flange 82 with axial width of first annular surface 100 and axial width of second annular surface 102, each measured parallel to axis 26, is larger than an axial extent of recess 94. Such axial extent of recess 94 may be the greatest or that which is the greatest except for axial extents of convex fillets of recess 94 adjacent to inside surface 90. First annular surface 100 may be sized smaller than first pilot surface 96 and may be sized to engage or contact first pilot surface 96, such as in a first pilot fit. Second annular surface 102 may be sized smaller than second pilot surface 98 and may be sized to engage or contact second pilot surface 98, such as in a second pilot fit. First pilot fit and second pilot fit, or said engagements, may act as force transfers and supports of shroud 46 such that, for example, when a blade portion contacts recess 94, outlet housing 42 absorbs a portion of the energy of the blade portion and alleviates the remaining portion of energy that is imparted to other components, such as inlet housing 40, shroud 46, and fastener 44. In other words, outlet housing 42 itself, through contact with shroud 46, absorbs a portion of the force of blade. Absorption of a portion of the force by outlet housing 42 may alleviate remaining force imparted on inlet housing 40 and such alleviation may prevent fracture of inlet housing 40. The absorption of force may also alleviate force on fasteners 44, such that fasteners 44 do not shear or break. Said absorption of force by outlet housing 42 may aid in trapping or deflecting the blade, such as by maintaining the integrity of outlet housing 42 or stationary enclosure 14, preventing one or more fasteners 44 from breaking and allowing a gap to form between shroud 46 and outlet housing 42 and blade fragments to escape. Flange 82 of shroud 46 may be made wide and deep enough to absorb a large enough portion of the force of blade 30 or a blade fragment such that blade 30 or the blade fragment is contained within inlet housing 40 and outlet housing 42 and there is no fracture of any portion of the exterior of inlet housing 40 or outlet housing 42. Inlet housing 40 and/or outlet housing 42 may further comprise respective flanges adjacent to shroud 46 to aide in force absorption and/or assembly.

Figure 2A:
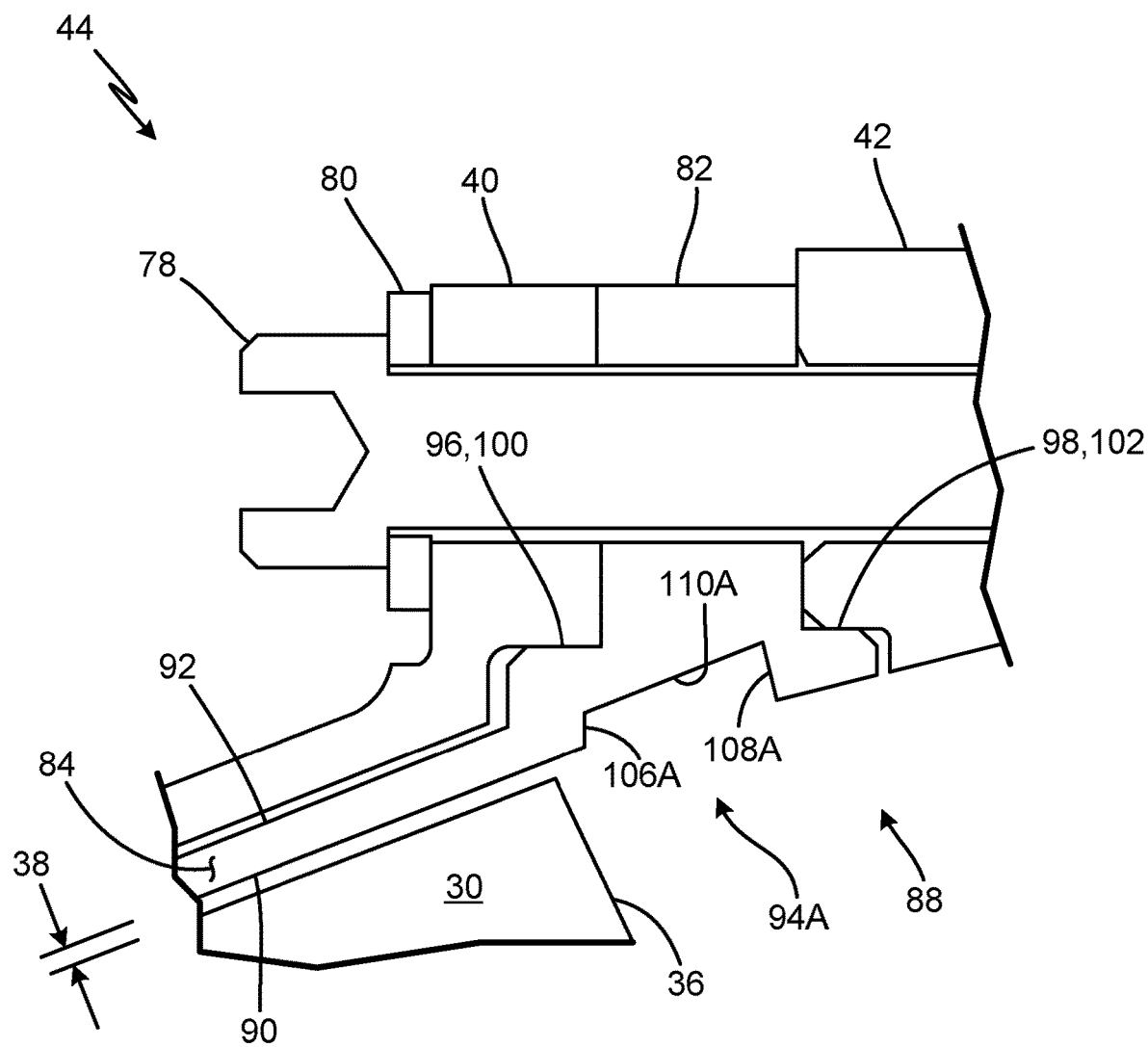
FIG. 2A is an enlarged partial cross-sectional view of an impeller shroud with a recess.

FIG. 2A shows an enlarged view of an embodiment of the second end of shroud assembled as part of scavenge blower assembly 10. Recess 94A extends a radial depth into annular member 84. Outermost frustoconical surface 110A of recess 94A is frustoconical and is a bottom surface. Recess 94A includes first end surface 106A opposing second end surface 108A, both of which define ends of recess 94A and are adjacent to frustoconical surface 110A. Second end surface 108A is closest to second end 88 of shroud 46 and traps and/or deflects blades or blade fragments during a blade-off event. A benefit of this embodiment may include that recess 94A is simple and cost effective to manufacture.

Figure 2B:
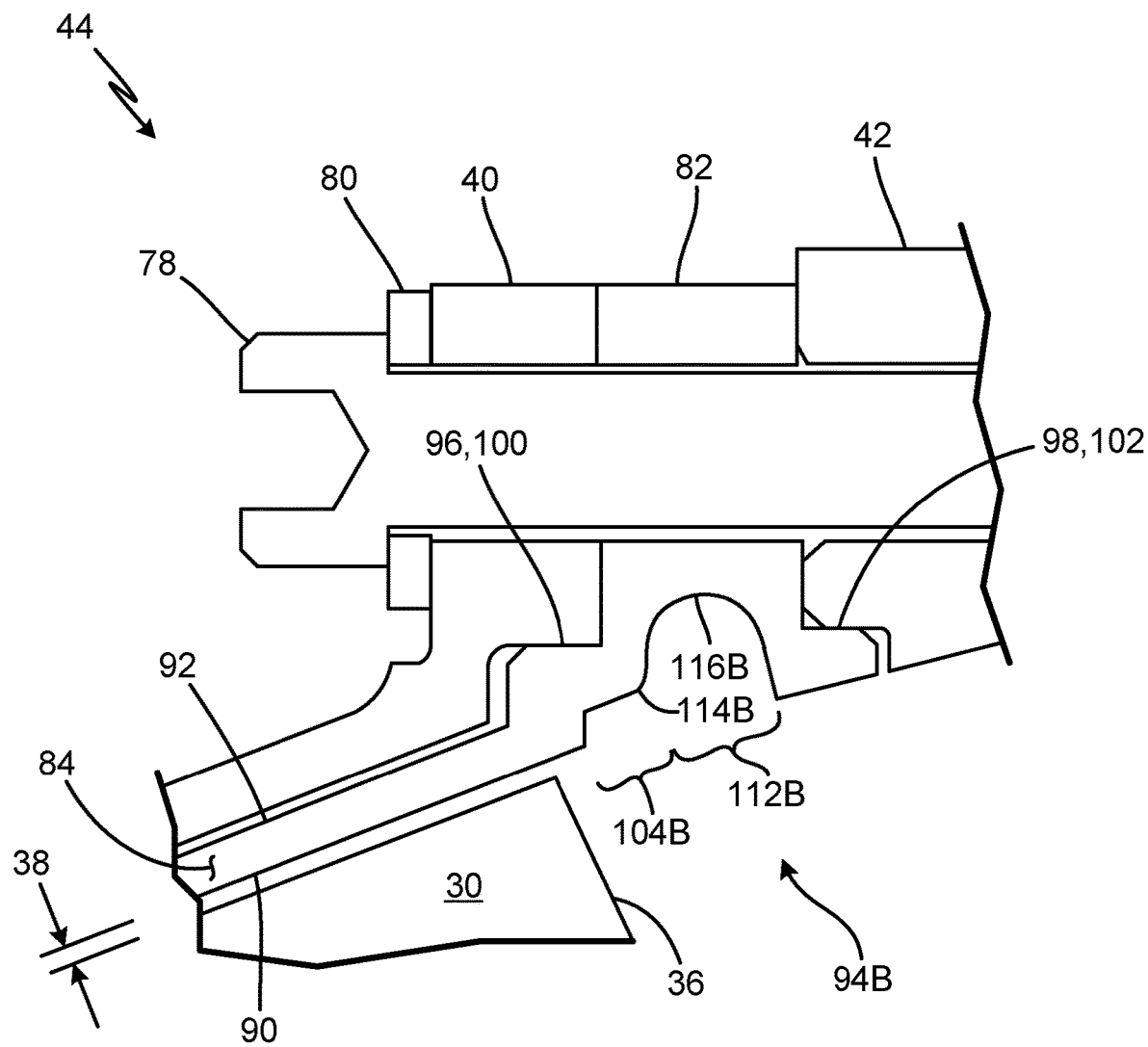
FIG. 2B is an enlarged partial cross-sectional view of an impeller shroud with a recess in which a portion of the recess has a greater radial depth than another portion of the recess.

FIG. 2B shows an enlarged view of an exemplary embodiment of the second end of shroud assembled as part of inlet particle separator. Recess 94B has first portion 104B joined to second portion 112B. First portion 104B extends first radial depth into annular member 84 from inside surface 90. First portion 104B is frustoconical. Second portion 112B is located between first portion 104B and second end 88 of shroud 46. Second portion 112B extends second radial depth into annular member 84, measured from inside surface 90 and being greater than first radial depth. Recess 94B further comprises convex transition 114B from first portion 104B to second portion 112B and second portion 112B has radially outer surface 116B that is concave. In some embodiments, first radial depth may be less than a thickness measured between inside surface 90 and outside surface 92. In some embodiments, radial depth of recess measured perpendicular from the inside surface to the radially outermost point of the recess is less than said thickness.

Benefits of second portion 112B may include further reducing weight of shroud 46 and increasing ability of shroud 46 to trap or deflect blade or blade fragments due to second portion 112B having a greater radial depth. A radially deeper recess 94B allows more of the blade or blade fragment to enter recess 94 and be more likely to be trapped or deflected by the recess. A benefit of having a concave radially outer surface 116B of second portion 112B is a lack of corners or edges and therefore smaller stress concentrations and being less likely to crack or fracture during an impact. Benefits of convex transition 114B at least include that a blade or blade fragment is more likely to avoid contacting convex transition 114B in a way that deflects the blade or blade fragment away from radially deeper portions of recess 94B. Therefore, convex transition 114B increases the chance that blade or blade fragment will be trapped or deflected by recess 94B.

Figure 2C:
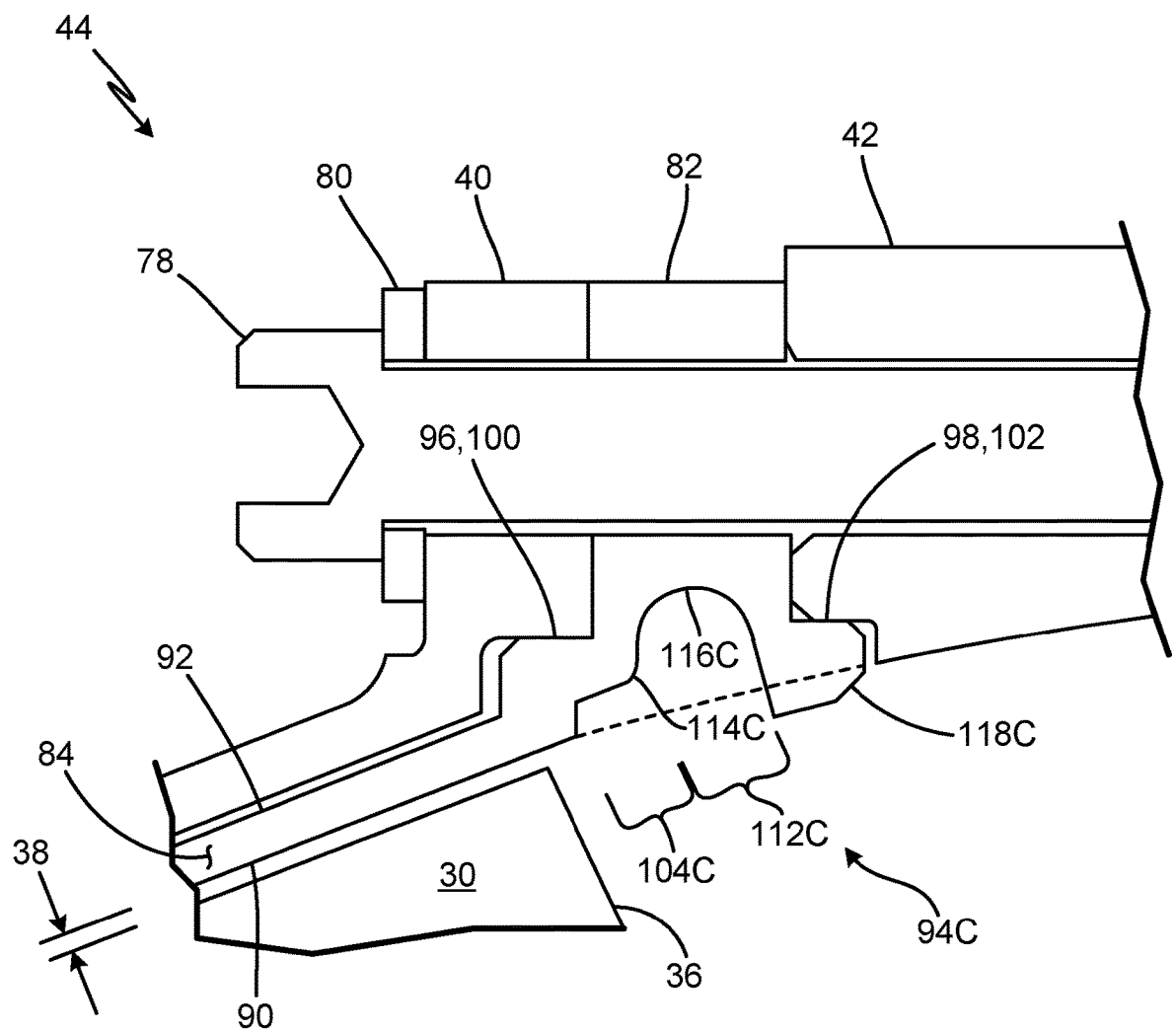
FIG. 2C is an enlarged partial cross-sectional view of an impeller shroud with a recess with a protrusion extending into the flow path.
Figure 2D:
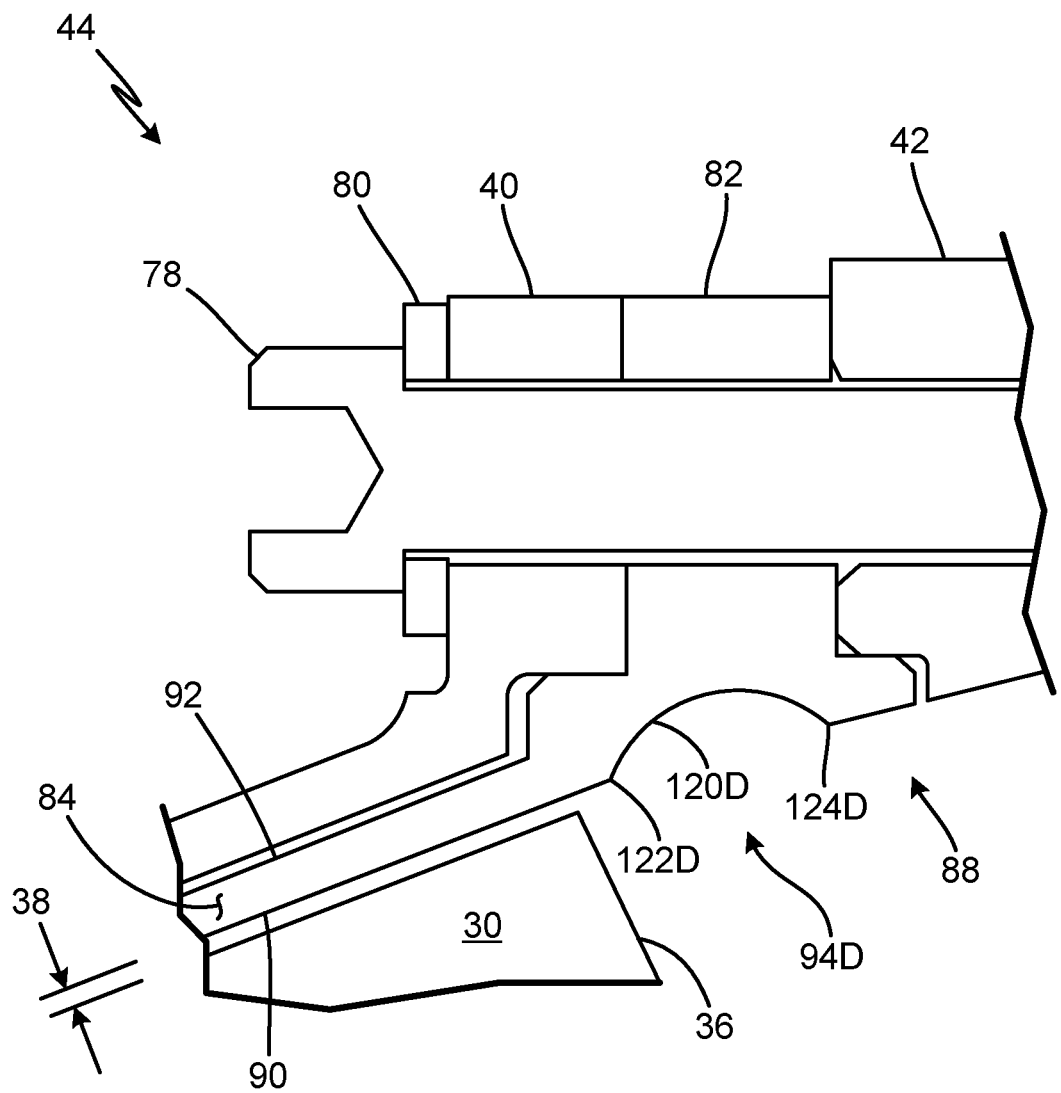
FIG. 2D is an enlarged partial cross-sectional view of an impeller shroud with a recess that has a concave surface.

FIG. 2C shows an enlarged view of an embodiment of second end of shroud assembled as part of inlet particle separator. Recess 94C has first portion 104C joined to second portion 112C. First portion 104C extends first radial depth into annular member 84 from inside surface 90 and is frustoconical. Second portion 112C is located between first portion 104C and second end 88 of shroud 46. Second portion 112C extends second radial depth into annular member 84, measured from inside surface 90 and being greater than first radial depth. Recess 94C further comprises convex transition 114C from first portion 104C to second portion 112C and second portion 112C has radially outer surface 116C that is concave.

Recess 94C further comprises protrusion 118C extending radially inward from inside surface 90 of shroud 46 at end of second portion 112C that is closest to second end 88 of shroud 46. Benefits of protrusion 118C may include increasing the likelihood of trapping, and alternatively or in combination deflecting, a blade or blade fragment in a blade-off event. Detriments of using protrusion 118C may include that protrusion 118C reduces the efficiency of rotary assembly and therefore protrusion 118C should only be used if rotary assembly has capacity to handle a reduction in performance caused by protrusion 118C.

FIG. 2D shows an enlarged view of an embodiment of second end of shroud assembled as part of inlet particle separator. Recess 94D includes concave surface 120D extending from first end 122D of recess on inside surface 90 to second end 124D of recess on inside surface 90. A benefit of this embodiment is that it may work to better deflect a blade or blade fragment, and therefore its force, in a blade-off event. This embodiment may, however, be less likely to trap a blade or blade fragment in a recess than embodiments described above. Deflecting, rather than trapping, may be desired in certain blade containment strategies such as deflecting a blade or blade fragment into stationary vanes.

Discussion of Possible Embodiments

The following are non-exclusive descriptions of possible embodiments of the present invention.

A shroud according to an exemplary embodiment of this disclosure, among other possible things, includes an annular member, a flange, and a recess. The annular member extends along an axis from a first end to a second end. An inside surface of the annular member is radially inward of an outside surface of the annular member and diverges from the first end towards the second end relative to the axis. The flange extends radially outward from the outside surface of the annular member at the second end of the annular member. The recess extends radially outward from the inside surface and circumferentially about the axis at the second end. The axial extent of the recess at least partially coincides with an axial extent of the flange.

The shroud of the preceding paragraph can optionally include, additionally and/or alternatively, any one or more of the following features, configurations and/or additional components:

A further embodiment of the foregoing shroud, wherein the inside surface of the annular member can be frustoconical.

A further embodiment of any of the foregoing shrouds, wherein the recess can include a first portion extending a first radial depth into the annular member from the inside surface and a second portion joined to the first portion and between the first portion and the second end of the shroud. The second portion extending a second radial depth into the annular member from the inside surface that is greater than the first radial depth.

A further embodiment of any of the foregoing shrouds, wherein the recess can include a convex transition from the first portion to the second portion.

A further embodiment of any of the foregoing shrouds, wherein a radially outer surface of the second portion can be concave.

A further embodiment of any of the foregoing shrouds, wherein a radially outermost surface of the first portion can be annular.

A further embodiment of any of the foregoing shrouds, wherein a radially outermost portion can be frustoconical.

A further embodiment of any of the foregoing shrouds, wherein the recess can include a protrusion extending radially inward from the inside surface of the shroud at an end of the second portion closest to the second end of the shroud.

A further embodiment of any of the foregoing shrouds, wherein the second portion of the recess can include an axial extent less than and entirely within the axial extent of the flange.

A further embodiment of any of the foregoing shrouds, wherein the first radial depth can be less than a thickness of the annular member defined between the inside surface and the outside surface.

A further embodiment of any of the foregoing shrouds, wherein the recess extends radially outward from the inside surface to a bottom surface and the bottom surface can be frustoconical.

A further embodiment of any of the foregoing shrouds, wherein the recess can include a concave surface extending from a first end of the recess on the inside surface to a second end of the recess on the inside surface.

A further embodiment of any of the foregoing shrouds, wherein the recess can extend from the inside surface by a radial depth defined as the perpendicular distance from the inside surface to the radially outermost point of the recess, and wherein the radial depth of the recess can be less than a thickness of the annular member defined between the inside surface and the outside surface.

An assembly according to an exemplary embodiment of this disclosure, among other possible things, includes an impeller rotatable about an axis, an inlet housing surrounding the impeller, and a shroud. The impeller includes a plurality of blades, each blade extending radially outward with respect to the axis to a tip and extending in a chordwise direction from a leading edge to a trailing edge. The shroud includes an annular member, a flange, and a recess. The shroud is positioned radially inward from the inlet housing and radially outward form the impeller forming a gap between the inside surface of the shroud and the tips of the blades. A recess in the shroud is disposed between the trailing edges of the blades and the second end of the annular member.

The assembly of the preceding paragraph can optionally include, additionally and/or alternatively, any one or more of the following features, configurations and/or additional components:

A further embodiment of the foregoing assembly, wherein the annular member can extend along an axis from a first end to a second end and an inside surface of the annular member diverges from the first end towards the second end relative to the axis.

A further embodiment of any of the foregoing assemblies, wherein the flange can extend radially outward from an outside surface of the annular member.

A further embodiment of any of the foregoing assemblies, wherein an axial extent of the recess can at least partially coincide with an axial extent of the flange.

A further embodiment of any of the foregoing assemblies, wherein the inside surface of the annular member can be frustoconical.

A further embodiment of any of the foregoing assemblies, wherein the recess can include a first portion extending a first radial depth into the annular member from the inside surface and a second portion joined to the first portion and between the first portion and the second end of the shroud. The second portion extending a second radial depth into the annular member from the inside surface that is greater than the first radial depth.

A further embodiment of any of the foregoing assemblies, wherein the recess can include a convex transition from the first portion to the second portion.

A further embodiment of any of the foregoing assemblies, wherein a radially outer surface of the second portion can be concave.

A further embodiment of any of the foregoing assemblies, wherein a radially outermost surface of the first portion can be annular.

A further embodiment of any of the foregoing assemblies, wherein a radially outermost portion can be frustoconical.

A further embodiment of any of the foregoing assemblies, wherein the recess can include a protrusion extending radially inward from the inside surface of the shroud at an end of the second portion closest to the second end of the shroud.

A further embodiment of any of the foregoing assemblies, wherein the second portion of the recess can include an axial extent less than and entirely within the axial extent of the flange.

A further embodiment of any of the foregoing assemblies, wherein the first radial depth can be less than a thickness of the annular member defined between the inside surface and the outside surface.

A further embodiment of any of the foregoing assemblies, wherein the recess extends radially outward from the inside surface to a bottom surface and the bottom surface can be frustoconical.

A further embodiment of any of the foregoing assemblies, wherein the recess can include a concave surface extending from a first end of the recess on the inside surface to a second end of the recess on the inside surface.

A further embodiment of any of the foregoing assemblies, wherein the recess can extend from the inside surface by a radial depth defined as the perpendicular distance from the inside surface to the radially outermost point of the recess, and wherein the radial depth of the recess can be less than a thickness of the annular member defined between the inside surface and the outside surface.

A further embodiment of any of the foregoing assemblies that can further include an outlet housing coupled to the inlet housing.

A further embodiment of any of the foregoing assemblies, wherein the flange can be axially disposed between the inlet and outlet housings to thereby axially restrain the shroud with respect to the inlet and outlet housings.

A further embodiment of any of the foregoing assemblies, wherein a first radially-outward-facing annular surface of the shroud can engage an opposing first pilot surface defined by the outlet housing.

A further embodiment of any of the foregoing assemblies, wherein a second radially-outward-facing annular surface of the shroud can engage an opposing second pilot surface defined by the inlet housing.

A further embodiment of any of the foregoing assemblies, wherein the flange can be disposed between the first and second annular surfaces of the shroud.

A further embodiment of any of the foregoing assemblies, wherein a summation of an axial width of the flange, an axial width of the first annular surface, and an axial width of the second annular surface can be greater than an axial extent of the recess.

A further embodiment of any of the foregoing assemblies, wherein the first annular surface can extend from a first axial face of the flange and the second annular surface can extend from a second axial face of the flange opposite the first axial face.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A shroud comprising:
an annular member extending along an axis from a first end to a second end and defining a flow path extending from the first end to the second end, wherein the second end is downstream from the first end relative the flow path, wherein a length of the annular member from the first end to the second end is within the flow path, the annular member having an inside surface radially inward from an outside surface, the inside surface diverging from the first end towards the second end relative to the axis;
a flange located at the second end and extending radially outward from the outside surface; and
a recess located at the second end and extending radially outward from the inside surface and circumferentially about the axis, wherein an axial extent of the recess at least partially coincides with an axial extent of the flange.

2. The shroud of claim 1, wherein the inside surface of the annular member is frustoconical.

3. The shroud of claim 1, wherein the recess comprises:
a first portion extending a first radial depth into the annular member from the inside surface; and
a second portion between the first portion and the second end of the shroud, wherein the second portion extends a second radial depth into the annular member from the inside surface that is greater than the first radial depth.

4. The shroud of claim 3, wherein the recess further comprises a convex transition from the first portion to the second portion, and wherein a radially outer surface of the second portion is concave.

5. The shroud of claim 3, wherein a radially outermost surface of the first portion is annular or frustoconical.

6. The shroud of claim 3, wherein the recess further comprises a protrusion extending radially inward from the inside surface of the shroud at an end of the second portion closest to the second end of the shroud.

7. The shroud of claim 3, wherein the second portion of the recess has an axial extent less than and entirely within the axial extent of the flange.

8. The shroud of claim 3, wherein the first radial depth is less than a thickness of the annular member defined between the inside surface and the outside surface.

9. The shroud of claim 1, wherein the recess extends radially outward from the inside surface to a bottom surface, and wherein the bottom surface is frustoconical.

10. The shroud of claim 1, wherein the recess comprises a concave surface extending from a first end of the recess on the inside surface to a second end of the recess on the inside surface.

11. The shroud of claim 1, wherein the recess extends from the inside surface by a radial depth defined as the perpendicular distance from the inside surface to the radially outermost point of the recess, and wherein the radial depth of the recess is less than a thickness of the annular member defined between the inside surface and the outside surface.

12. An assembly comprising:
an impeller rotatable about an axis, wherein the impeller comprises a plurality of blades, each blade extending radially outward with respect to the axis to a tip and extending in a chordwise direction from a leading edge to a trailing edge;
an inlet housing surrounding the impeller; and
a shroud comprising:
an annular member extending along the axis from a first end to a second end, the annular member having an inside surface radially inward from an outside surface, the inside surface diverging from the first end towards the second end relative to the axis,
a flange located at the second end and extending radially outward from the outside surface; and
a recess located at the second end and extending radially outward from the inside surface and circumferentially about the axis, wherein an axial extent of the recess at least partially coincides with an axial extent of the flange;
wherein the shroud is positioned radially inward from the inlet housing and radially outward from the impeller forming a gap between the inside surface of the shroud and the tips of the blades,
wherein the recess is disposed completely between the trailing edges of the blades and the second end of the annular member.

13. The assembly of claim 12, further comprising an outlet housing coupled to the inlet housing, wherein the flange is axially disposed between the inlet and outlet housings to thereby axially restrain the shroud with respect to the inlet and outlet housings.

14. The assembly of claim 13, wherein the shroud further comprises:
a first radially-outward-facing annular surface engaging an opposing first pilot surface defined by the outlet housing.

15. The assembly of claim 14, wherein the shroud further comprises:
a second radially-outward-facing annular surface engaging an opposing second pilot surface defined by the inlet housing,
wherein the flange is disposed between the first and second annular surfaces of the shroud.

16. The assembly of claim 15, wherein a summation of an axial width of the flange, an axial width of the first annular surface, and an axial width of the second annular surface is greater than an axial extent of the recess.

17. The assembly of claim 15, wherein the first annular surface extends from a first axial face of the flange and the second annular surface extends from a second axial face of the flange opposite the first axial face.

18. A method of deflecting an impeller component released from an impeller comprising blades, each blade extending radially outward to a tip and in a chordwise direction from a leading edge to a trailing edge, the method comprising:

positioning the shroud of claim 1 radially inward from an inlet housing surrounding the impeller and radially outward from the impeller forming a gap between the inside surface of the shroud and the tips of the blades, wherein the recess is disposed between the trailing edges of the blades and the second end of the annular member.

19. The method of claim 18, the method further comprising:

engaging a first annular surface of the shroud with a first pilot surface of the inlet housing.

20. The method of claim 19, the method further comprising:

engaging a second annular surface of the shroud with a second pilot surface of an outlet housing coupled to the inlet housing.

* * * * *